(12) United States Patent
Laurenti

(10) Patent No.: US 10,649,878 B2
(45) Date of Patent: May 12, 2020

(54) RECORDING PROCESSOR INSTRUCTION EXECUTION CYCLE AND NON-CYCLE COUNT TRACE EVENTS

(71) Applicant: Texas Instruments Incorporated, Dallas, TX (US)

(72) Inventor: Gilbert Laurenti, St. Paul (FR)

(73) Assignee: Texas Instruments Incorporated, Dallas, TX (US)

(*) Notice: Subject to any disclaimer, the term of this patent is extended or adjusted under 35 U.S.C. 154(b) by 1193 days.

(21) Appl. No.: 14/556,490

(22) Filed: Dec. 1, 2014

(65) Prior Publication Data

US 2015/0089301 A1 Mar. 26, 2015

Related U.S. Application Data

(62) Division of application No. 12/859,035, filed on Aug. 18, 2010, now abandoned.

(30) Foreign Application Priority Data

Aug. 10, 2010 (EP) ..................................... 10290443

(51) Int. Cl.
*G06F 11/34* (2006.01)
*G06F 11/36* (2006.01)

(52) U.S. Cl.
CPC ........ *G06F 11/348* (2013.01); *G06F 11/3466* (2013.01); *G06F 11/364* (2013.01); *G06F 2201/86* (2013.01)

(58) Field of Classification Search
CPC ..................................................... G06F 11/348
See application file for complete search history.

(56) References Cited

U.S. PATENT DOCUMENTS

| | | | | | |
|---|---|---|---|---|---|
| 6,009,270 | A | * | 12/1999 | Mann | G06F 11/348 714/E11.195 |
| 6,145,123 | A | * | 11/2000 | Torrey | G06F 9/30101 703/28 |
| 6,539,500 | B1 | * | 3/2003 | Kahle | G06F 11/3636 710/18 |
| 6,813,731 | B2 | * | 11/2004 | Zahavi | G06F 11/3034 714/45 |
| 7,174,543 | B2 | * | 2/2007 | Schwemmlein | G06F 1/04 717/128 |
| 7,207,035 | B2 | * | 4/2007 | Kobrosly | G06F 8/41 703/22 |
| 2011/0239196 | A1 | * | 9/2011 | Ichard | G06F 11/3636 717/127 |

* cited by examiner

*Primary Examiner* — Andre D Boyce
(74) *Attorney, Agent, or Firm* — Lawrence J. Bassuk; Charles A. Brill; Frank D. Cimino

(57) ABSTRACT

A program is executed on a processor to produce execution events. The execution events are traced using a first trace mode during a first portion of the program execution, wherein a portion of trace information for the execution events is omitted from a trace report while tracing in the first trace mode. The mode of tracing is dynamically changed to a second trace mode in response to an event trigger, such that all execution events that occur during the change of mode are captured. Execution events are traced during a second portion of the program execution using the second trace mode, wherein additional trace information for the execution events is included in the trace report while tracing in the second trace mode. The trace mode may be dynamically switched between the two trace modes during execution of the program.

6 Claims, 4 Drawing Sheets

RECORDING PROCESSOR INSTRUCTION EXECUTION CYCLE AND NON-CYCLE COUNT TRACE EVENTS

CLAIM OF PRIORITY

This application is a divisional of prior application Ser. No. 12/859,035, filed Aug. 18, 2010, now abandoned;

Which claims priority to European Patent Application No. 10290443.0/EP10290443, entitled "Mixed Mode Processor Tracing" filed Aug. 10, 2010 which is incorporated by reference herein.

FIELD OF THE INVENTION

This invention generally relates to application software development, software integration, and system optimization of complex integrated circuits and in particular to tracing hardware and software events.

BACKGROUND OF THE INVENTION

Testing and debugging of a new application specific integrated circuit (ASIC) or of a new or modified application program running on an ASIC requires insight into the internal workings of busses and program execution. The IEEE 1149.1 (JTAG) standard has proven to be a very robust solution to a variety of test and debug systems, enabling a rich ecosystem of compliant products to evolve across virtually the entire electronics industry. Yet increasing chip integration and rising focus on power management has created new challenges that were not considered when the standard was originally developed. The Mobile Industry Processor Interface (MIPI) Test and Debug Working group has selected a new test and debug interface, called P1149.7, which builds upon the IEEE1149.1 standard. P1149.7 enables critical advancements in test and debug functionality while maintaining compatibility with IEEE 1149.1.

In order to provide more visibility into the execution of programs within a complicated system on a chip (SOC), instruction execution tracing may be provided. Various capabilities for instruction tracing have been provided for processors in the past; for example, a test system provided by Texas Instruments, "Code Composer Studio" uses a trace buffer included within a microprocessor to trace program execution by recording address traces and when a discontinuity occurred in an instruction execution sequence, such as by taking a jump or receiving an interrupt. Another example of program execution tracing is provided by ARM Limited, which provides a program trace macrocell (PTM) for use with processor cores in an ASIC.

In addition to P1149.7, the MIPI test and debug interface specifies how multiple on-chip test access port (TAP) controllers can be chained in a true IEEE1149.1 compliant way. It also specifies a System Trace Module (STM). STM consists of a System Trace Protocol (STP) and the Parallel Trace Interface (PTI). The signals and pins required for these interfaces are given through the 'MIPI Alliance Recommendation for Test & Debug—Debug Connector', also part of the MIPI test and debug interface. The main blocks of the MIPI Debug and Trace Interface (DTI), seen from outside of the system, include: a debug connector; the basic debug access mechanism: JTAG and/or P1149.7; a mechanism to select different TAP controllers in a system (Multiple TAP control); and a System Trace Module.

BRIEF DESCRIPTION OF THE DRAWINGS

Embodiments in accordance with the invention will now be described, by way of example only, and with reference to the accompanying drawings.

DETAILED DESCRIPTION OF EMBODIMENTS OF THE INVENTION

In order to test and debug a new application specific integrated circuit (ASIC) or a new or modified application program running on an ASIC, various events that occur during execution of an application or a test program are traced and made available to an external test device for analysis. The trace report typically includes trace data representative of a sequence of execution events that indentifies each discontinuity in program execution. A time stamps may be included with each execution event, and stand alone time stamps may also be provided to enable the external test device to determine approximately how long it takes to execute various pieces of the application or test code. In order to provide a fine grain analysis of code execution, tracing may be performed in a mode that includes the number of processor cycles that occur between each reported trace event. However, the extra amount of data required to report cycle count information increases the bandwidth required to transmit the trace report from the unit under test to the external test device.

Embodiments of the present invention provide a scheme to dynamically switch between two or more modes of tracing in which cycle accurate information is reported in one mode and non-cycle accurate data is reported in another mode. During the switch between the modes of tracing, program execution continues and any traceable events that occur are traced and included in the trace report.

The trace report is transmitted from the SOC being tested to an external test system over a link having a transmission bandwidth. In some embodiments the trace report has a data bandwidth that is less than the transmission bandwidth while in the non-cycle accurate mode and a data bandwidth that is greater than the transmission bandwidth while in the cycle accurate trace mode. In this case, the excess trace information may be stored in an elastic buffer while in the cycle accurate trace mode, and then transmitted later as bandwidth becomes available.

Figure 1:
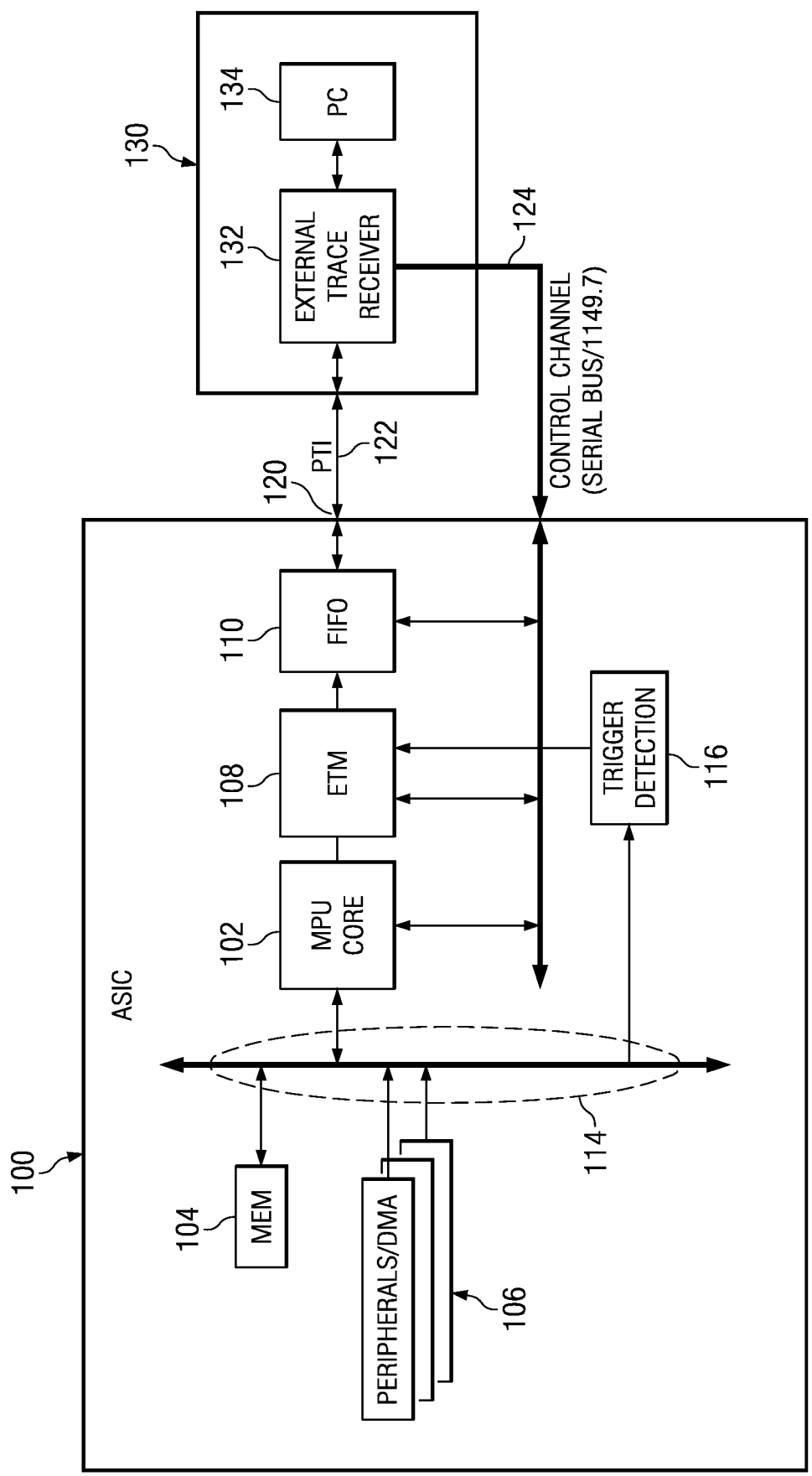
FIG. 1 is a block diagram illustrating a exemplary application specific integrated circuit (ASIC) with an execution trace module (ETM)

FIG. 1 is a block diagram illustrating an exemplary application specific integrated circuit (ASIC) 100 with an execution trace module (ETM) 108 closely coupled to microprocessor unit (MPU) core 102. For purposes of this disclosure, the somewhat generic term "ASIC" is used to apply to any complex system on a chip (SOC) that may include one or more processors 102, memory 104, and/or peripherals and DMA (direct memory access) controllers 106. Each MPU may also include embedded memory.

ETM 108 is coupled to the MPU core and has access to various internal buses so that it can monitor the progress of instruction execution. It evaluates instructions that may cause program execution to jump out of line, such as branch instructions, conditional branch instructions, returns, etc. It also monitors for interrupts and other exception events that may cause program execution to jump to a new location. ETM 108 also monitors clock circuitry within the MPU core so that it can count the number of processor cycles between each execution event. Typically, a processor cycle is the smallest unit of time and corresponds to one cycle of the processor instruction pipeline execution.

When an external test system 130 is connected to ASIC 100 via interconnect 122, the ETM may transmit sequences of trace events and time stamps directly to external trace receiver 132 as they are received. Interconnect 122 may include signal traces on a circuit board or other substrate on which ASIC 100 is mounted and may be connected to a parallel trace interface (PTI) 120 provided by ASIC 100. Interconnect 122 may include a connector to which a cable or other means of connecting to external trace receiver 132 is coupled. A control channel 124 such as a serial bus or P1149.7 may be used to provide control information from external trace device 130 to ASIC 100.

Test system 130 generally will include one or more processors, such as processor 134 and a user interface that allows a test engineer, for example, to control, monitor, and evaluate execution of programs and the resulting trace data on ASIC 100. In a typical scenario, the test system has a copy of the program that is being executed by ASIC 100. A trace event is generally produced for each jump or branch instruction that is processed by ASIC 100 and indicates how the program execution sequence is affected by the jump or branch instructions. Similarly, a trace event is produced for other events such as an interrupt or exception event that changes the execution stream. For example, if a conditional branch is taken, this fact is included in the trace event produced by execution of the conditional branch instruction. The test system can determine the branch address by analyzing the program code. If the conditional branch is not taken, then this fact is included in the trace event. For interrupts and exceptions, the trace event needs to include the resulting address of where instruction execution is transferred so that the test system can know where to refocus its code analysis. If a long stretch of code is executed inline, ETM 108 may insert periodic synchronization events to indicate to the test system where the current execution point is. Similarly, ETM 108 may also generate standalone timestamp events to help the test system in correlating the instruction execution, especially if multiple instruction streams from multiple processors on ASIC 100 are being traced.

As trace events are received at test system 130, they are correlated to the instructions in the program and can then be displayed to the test engineer to indicate exactly what code is being executed and, by using the time stamps, how long it takes to execute a particular piece of instruction code. The general operation of test systems is generally well known and will not be described further herein.

In this embodiment, an elastic first-in first-out (FIFO) buffer 110 is coupled between ETM 108 and parallel trace interface (PTI) 120. In some embodiments, FIFO 110 may be small, such as only a few entries. In other embodiments, FIFO 110 may provide storage for several hundred or several thousand trace events and associated time stamps and cycle count data. Use of FIFO 110 will be described in more detail below.

Figure 2:
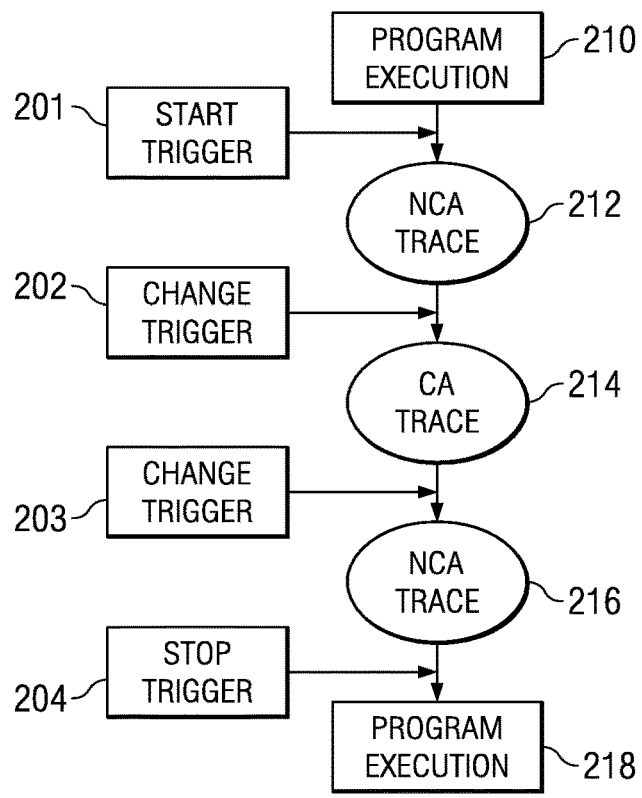
FIG. 2 is a flow diagram illustrating operation of tracing program execution while dynamically changing the mode of tracing.

FIG. 2 is a flow diagram illustrating operation of tracing while dynamically changing cycle count accuracy. As discussed above, several types of trace events may be generated by ETM 108 to allow test system 130 to analyze program execution on ASIC 100. In some situations, such as hard real time applications, the exact timing of program execution is critical. In these instances, the time stamps provided with the trace events may not be accurate enough. In order to provide more accurate execution time, some or all of the trace events may include the cycle-count of processor cycles that have occurred since the last trace event. In this manner, the test system can determine exactly how much time is spent in each portion of the instruction execution stream.

However, this additional accuracy comes at a cost of additional bandwidth required to transmit the cycle-count information along with the trace events. In the exemplary embodiment of FIG. 1, the data bandwidth for cycle accurate tracing is about 2.5 times the data bandwidth of non-cycle accurate tracings. As processor speeds increase, multiple processor cores are included in SOCs, debug pin budgets are reduced, and power allocated to output buffers for the pins is restricted by electromagnetic interference issues, the transmission bandwidth available on PTI 120 and interconnect 122 may not allow tracing in cycle accurate mode for an extended period of time. Embodiments of the present invention allow tracing to proceed in the lower bandwidth non-cycle accurate tracing mode for most of the program execution, but allow tracing to zoom in on a particular section of instruction code be dynamically changing to the higher bandwidth cycle accurate tracing mode while the particular section of code is being executed.

Referring again to FIG. 2 for example, test system 130 may set up ASIC 100 to execute one or more programs on its one or more processors. Execution 210 may proceed for a while without being traced. A particular action, which may be set up by test system 130, may trigger 201 tracing to begin. Trigger 201 may be in response to executing from a particular address, storing or fetching data from a particular address, or similar types of events that are supported by trigger detection circuitry 116 within ASIC 100, referring again to FIG. 1. Trigger circuitry 116 may be coupled to one or more address and/or data buses within ASIC 100, as indicated at 114. Test system 130 may set up trigger circuitry 116 via control channel 124 to generate a trigger event based on a specific data occurrence, address occurrence, etc. Further, each trigger event may cause a register or set of registers to be accessed for a programming model that may define an action to be taken upon detection of the trigger event. The programming model for each trigger event may include information, such as a single bit, to indicate if cycle accurate or non-cycle accurate tracing is to be performed. Trigger detection is transparent to the program execution and does not cause program execution to halt or to slow down.

In the example of FIG. 2, the programming model for start trigger 201 includes a bit that instructs ETM 108 to trace in non-cycle accurate (NCA) mode. Thus, a portion of the sequence of execution events is traced 212 using the non-cycle accurate mode and trace information is reported indicative of the execution events during this portion of the program execution. In this mode of tracing, the cycle count information is omitted from the trace report.

Eventually, another trigger occurs, such as change trigger 202. Trigger 202 may be in response to executing from a particular address, storing or fetching data from a particular address, or similar types of events that are supported by trigger detection circuitry 116 within ASIC 100. The programming model for trigger 202 includes a bit that instructs ETM 108 to trace in cycle accurate (CA) mode. Thus, a contiguous portion of the sequence of execution events is traced 214 using the cycle accurate mode and trace information is reported indicative of the execution events during this portion of the program execution. In this mode of tracing, the additional cycle count information is included in the trace report.

Eventually, another trigger occurs, such as change trigger 203. Trigger 203 may be in response to executing from a particular address, storing or fetching data from a particular address, or similar types of events that are supported by trigger detection circuitry 116 within ASIC 100. The programming model for trigger 203 includes a bit that instructs ETM 108 to trace in non-cycle accurate mode. Thus, another portion of the sequence of execution events is traced 216 contiguously using the non-cycle accurate mode and trace information is reported indicative of the execution events during this portion of the program execution. In this mode of tracing, the additional cycle count information is omitted from the trace report.

In this manner, tracing may continue for an extended period of time, with multiple changes in the mode of tracing. During each change of tracing mode, ETM 108 records all execution events that occur so that no trace information is lost.

Eventually, stop trigger 204 may be detected and cause tracing to be stopped. Program execution 218 may continue, but no trace information is reported. Alternatively, instruction execution may be stopped in response to trigger 204 or in response to a command from the test system.

In this embodiment, each trigger includes a bit to indicate which mode to trace in. A single bit may be used, and when it is in one logic state indicates cycle accurate tracing mode and when in another logic state it indicates non-cycle accurate tracing mode. In another embodiment, tracing may start in a default mode, such as non-cycle accurate tracing mode, and each change trigger may indicate that the tracing mode is to be toggled. In another embodiment, multiple bits may be included in the trigger to indicate one of two or more modes of tracing. For example, one mode may be non-cycle accurate tracing; a second mode may be cycle accurate tracing; a third mode may be to perform cycle accurate tracing for a period of time and then automatically revert to non-cycle accurate tracing, etc.

Figure 3:
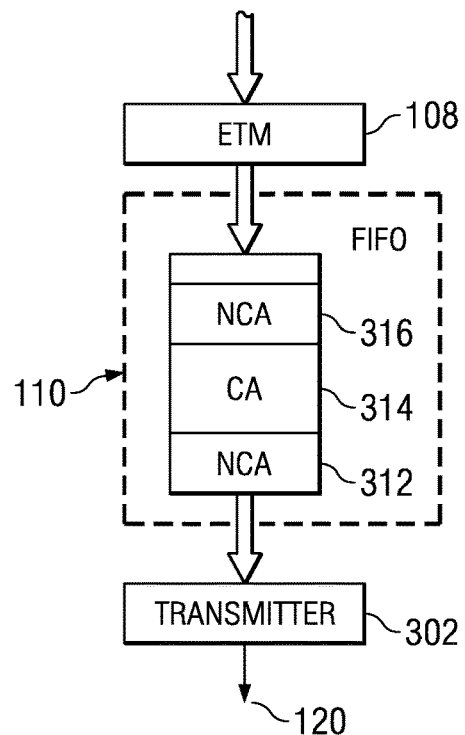
FIG. 3 is a block diagram illustrating use of the output FIFO to manage bandwidth requirements.

FIG. 3 is a block diagram illustrating use of output FIFO 110 to manage bandwidth requirements. Referring again to FIG. 1, elastic output FIFO 110 is coupled to execution trace module 108 and is operable to store a sequence to trace information from the system trace module. In various embodiments, other trace sources within SOC 100 may also be multiplexed with the output of ETM 108 and provided to FIFO 110. In this embodiment, output FIFO is large enough to hold several hundred trace events. The output of FIFO 110 is coupled to transmitter 302. In this embodiment, transmitter 302 is merely the drive buffers that are connected to PTI 120. In another embodiment, transmitter 302 may transmit the trace report using electrical, infrared, optical, radio frequency, or other means now known or later developed for transmitting data to another location.

As mentioned earlier, when tracing in cycle accurate trace mode, the data bandwidth may exceed the transmission bandwidth of transmitter 302. In this case, FIFO 110 may temporarily store a portion of the trace report. For example, a first portion 312 of trace data is non-cycle accurate (NCA) trace data, which has a data bandwidth that is lower than the transmission bandwidth of transmitter 302. Therefore, transmitter 302 can keep up with non-cycle accurate trace data. Another portion 314 of trace data is cycle accurate (CA) trace data. As mentioned earlier, in this embodiment, the data bandwidth of CA data is approximately 2.5 times that of NCA trace data, and the transmission bandwidth of transmitter 302 is less than the data bandwidth of CA trace data. FIFO 110 may store the excess CA data for transmission later after the next portion 316 on NCA data is being traced. In this manner, short periods of CA data can be transmitted without stalling the system even when the data bandwidth of CA data exceeds the transmission bandwidth of transmitter 302. In this manner, data overflows and blank portions in the trace stream are avoided.

Figure 4:
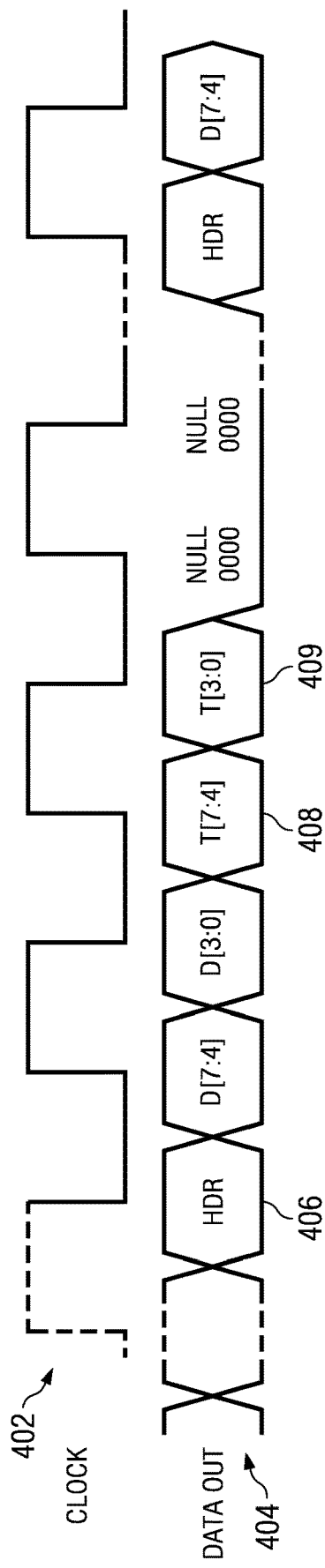
FIGS. 4 and 5 are timing diagrams illustrating data streams for two different modes of tracing.

FIG. 4 is a timing diagram illustrating an exemplary NCA data stream 404 format of one trace event which includes a time stamp 408-409. The exemplary format transmits four-bit nibbles on four-bit interconnect 122 during each phase of clock signal 402. In this instance, a header message identifier 406 indicates an eight bit trace data value and a time stamp follows. In this embodiment, when cycle count data is included for cycle accurate tracing, additional four bit data nibbles are included after the trace data and before the time stamp data. Message identifier 406 may include a bit field to indicate that additional cycle count data is not included with the trace data.

Figure 5:
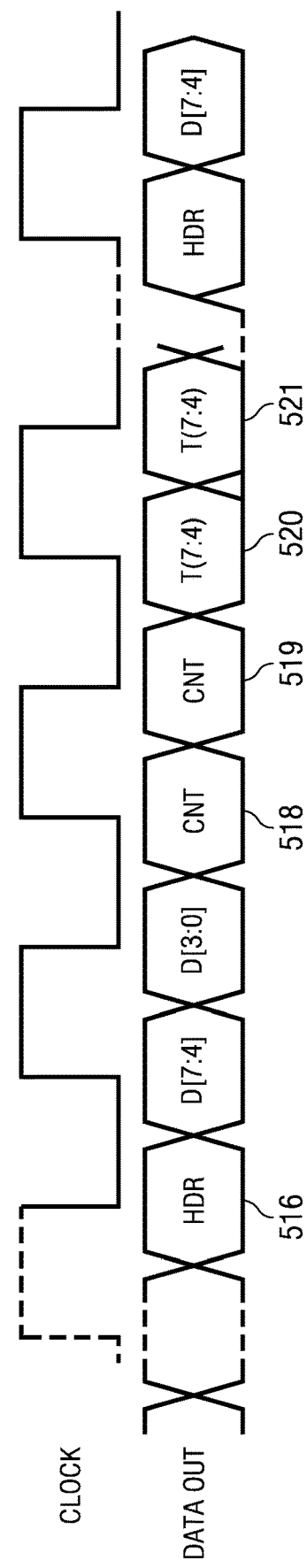

FIG. 5 is a timing diagram illustrating a CA data stream format of one trace event which includes cycle count data 518-519 and a time stamp 520-521. Message header 516 may include a bit field to indicate that additional cycle count data is included with the trace data. Depending on the cycle count value, additional data nibbles may be required to hold the value.

Other embodiments may use a different format than this exemplary four-bit format for conveying the trace data. For example, a different or more extensive header may be used, data widths may be different, encodings may be different, etc.

As another example, ARM Limited defines a format for NCA and CA trace data in the "CoreSight™ Program Flow Trace Architecture Specification", v1.0, 2008.

Alternatively, in another embodiment, a special message identifier may be inserted in the trace report to indicate the trace mode of trace data following it. For example, a first identifier may indicate that all following trace data is NCA data. When the trace mode is dynamically changed, an ETM may then insert another identifier to indicate that all following trace data is now CA data. As each mode change is made, another mode indicator is inserted in the trace report.

Thus, in various embodiments the test system is able to receive the trace report stream of data and determine which mode the trace data represents, such as by decoding each trace event, by detecting a mode change indicator, or by other signaling means.

System Application

Figure 6:
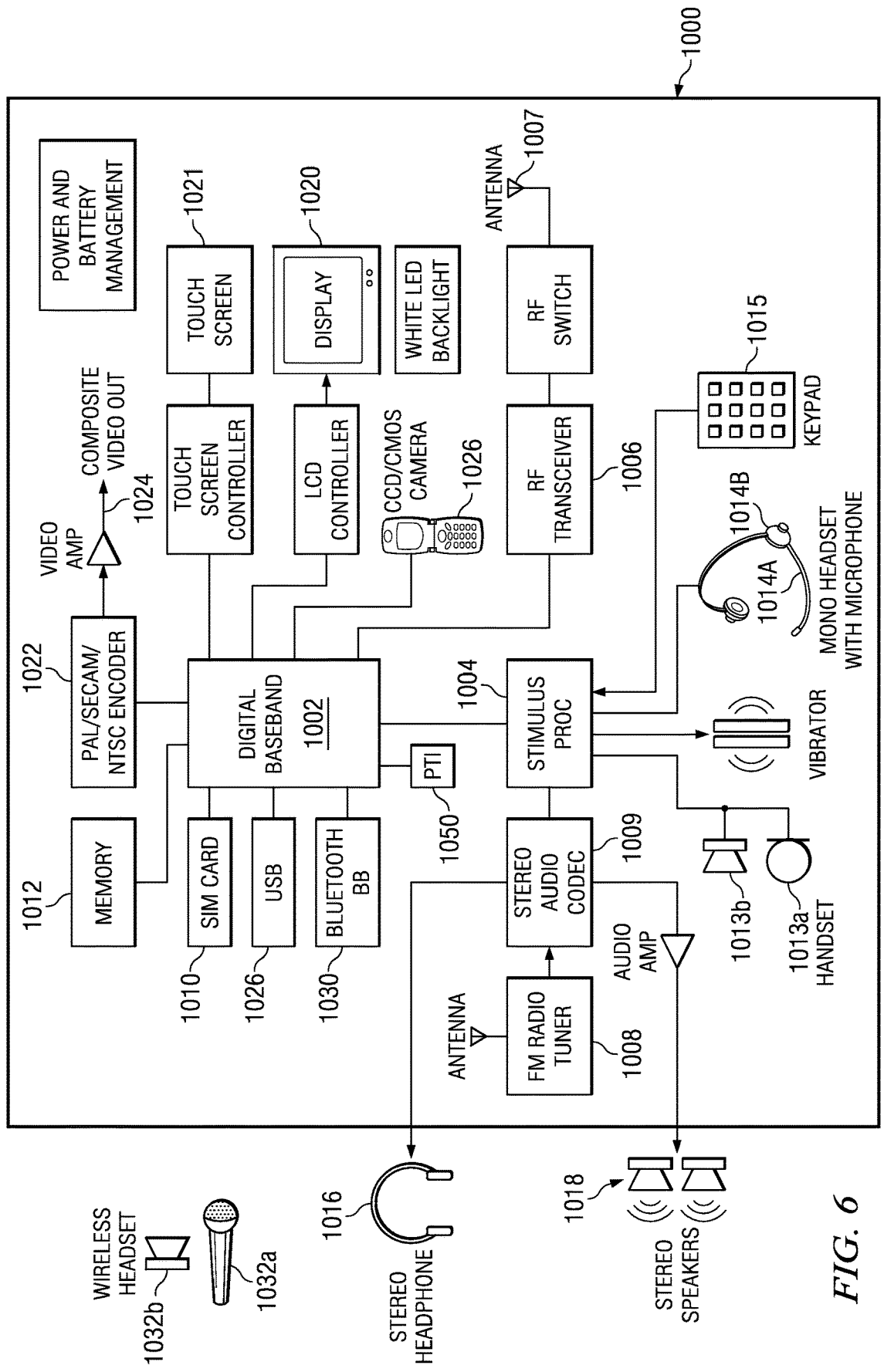
FIG. 6 is a block diagram illustrating a system that includes an embodiment of an ASIC with an ETM.

FIG. 6 is a block diagram of mobile cellular phone 1000 for use in the network of FIG. 1. Digital baseband (DBB) unit 1002 can include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 includes a receiver for receiving a stream of coded data frames and commands from a cellular base station via antenna 1007 and a transmitter for transmitting a stream of coded data frames to the cellular base station via antenna 1007. Transmission of the PUSCH data is performed by the transceiver using the PUSCH resources designated by the serving eNB. Control information is transmitted using the PUCCH. In some embodiments, frequency hopping may be implied by using two or more bands as commanded by the serving eNB. In this embodiment, a single transceiver can support multi-standard operation (such as EUTRA and other standards) but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by the mobile UE unit 1000.

The EUTRA defines SC-FDMA (via DFT-spread OFDMA) as the uplink modulation. The basic SC-FDMA DSP radio can include discrete Fourier transform (DFT), resource (i.e. tone) mapping, and IFFT (fast implementation of IDFT) to form a data stream for transmission. To receive the data stream from the received signal, the SC-FDMA radio can include DFT, resource de-mapping and IFFT. The operations of DFT, IFFT and resource mapping/de-mapping may be performed by instructions stored in memory 1012 and executed by DBB 1002 in response to signals received by transceiver 1006.

DBB 1002 contains an ETM as described above with respect to FIGS. 1-5. The ETM is coupled to the DSP internal to DBB 1002 and is operable to collect trace events to aid in debugging the various DSP radio tasks described above. A contiguous sequence of trace events dynamically changing between NCA and CA mode can be transmitted to an external trace receiver when one is coupled to PTI connector 1050. Alternatively, the PTI connector may be omitted from production units and only provided on a prototype or test version of cell phone 1000.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032*a* and headset 1032*b* for sending and receiving voice data. DBB 1002 can also be connected to display 1020 and can send information to it for interaction with a user of the mobile UE 1000 during a call process. Display 1020 may also display pictures received from the network, from a local camera 1026, or from other sources such as USB 1026. DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder unit 1022 can provide encoding according to PAL/SECAM/NTSC video standards.

OTHER EMBODIMENTS

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

While the invention has been described with reference to illustrative embodiments, this description is not intended to be construed in a limiting sense. Various other embodiments of the invention will be apparent to persons skilled in the art upon reference to this description. For example, another embodiment may use another test and debug interface that is not related to MIPI. In various embodiments, narrow or wide versions of P1149.7 may be used. Other embodiments may use interconnects that are not P1149.7 based.

In other embodiments, the dynamic tracing mode switch or "zoom" concept described above may be extended to include a one or more of a number of different trace modes, such as any one or more of the following trace modes:

Changing the periodic time stamp injection rate, for example: periodic time stamp injection frequency X, then dynamically change to periodic time stamp injection frequency Y, then dynamically change to Periodic time stamp injection frequency X, etc;

Background tasks NCA/Interrupts CA/Background tasks NCA;

address/address+data/address;
compressed/uncompressed/compressed;
without qualifiers/with qualifiers/without qualifiers;
Public/Public & Secure/Public;
Initiator X/Initiators X & Y/Initiator X;
DMA transfers boundaries/DMA transfers details/DMA transfers boundaries;
main discontinuities/all discontinuities/main discontinuities;
Performance metric A/Performance metrics A,B,C/Performance metric A;
power management (PM) events/PM & CM events/PM events;
Subset of events/all events/subset of events.

In some embodiments, the ASIC may be mounted on a printed circuit board. In other embodiments, the ASIC may be mounted directly to a substrate that carries other integrated circuits. Various sizes and styles of connectors may be used for connection to an external trace receiver.

A second mode of operation is supported in some embodiments. An external trace device may not be connected to an ASIC during a trace capture episode, or there may not be a provision for connecting an external trace device. In this mode, an ETM within the ASIC transmits the sequences of trace data and associated time stamps to an embedded trace buffer (ETB) within the ASIC via an internal bus or other interconnect. In this case, after a debug session, the contents of the ETB may be transferred to another device by using another interface included within the ASIC, such as via a USB (universal serial bus) for example. Alternatively, after a debug session an external trace receiver may then be connected to the ASIC and the contents of the ETB may be accessed and then transmitted to the external trace device.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

What is claimed is:

1. A process of reporting trace information from an integrated circuit comprising:

executing program code in a processor operating in clock cycles, the processor including clock circuitry;

tracing first mode information on events and cycle-counts of execution of the program code, the first mode information including a number of processor cycles that occur between trace events;

tracing second mode information on events of execution of the program code, the second mode information omitting a number of processor cycles that occur between trace events;

changing between the tracing first mode information and the tracing second mode information in response to an event trigger bit;

transmitting from the integrated circuit the second mode information; and storing in the integrated circuit the first mode information and then later transmitting from the integrated circuit the first mode information.

2. The process of claim 1 including transmitting the first mode information and the second mode information over a link having a transmission data bandwidth, the transmission data bandwidth being less than a data bandwidth of the first mode information, and the transmission data bandwidth being greater than a data bandwidth of the second mode information.

3. The process of claim 1 including formatting the first mode information different from the second mode information.

4. The process of claim 1 including inserting a mode change indicator in the first mode information and in the second mode information.

5. The process of claim 1 in which the storing includes storing the first mode information in a buffer and then later transmitting from the buffer the first mode information.

6. The process of claim 1 in which the tracing includes tracing in response to trigger circuitry generating a trigger event and programming for each trigger event includes information to indicate tracing for the first mode information or the second mode information.

* * * * *